United States Patent
Sugai et al.

(10) Patent No.: US 10,533,658 B2
(45) Date of Patent: Jan. 14, 2020

(54) MOTOR VEHICLE, CONTROL APPARATUS FOR MOTOR VEHICLE, AND CONTROL METHOD FOR MOTOR VEHICLE

(71) Applicant: TOYOTA JIDOSHA KABUSHIKI KAISHA, Toyota-shi, Aichi-ken (JP)

(72) Inventors: Shinichi Sugai, Toyota (JP); Mitsuyori Matsumura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 98 days.

(21) Appl. No.: 15/924,894

(22) Filed: Mar. 19, 2018

(65) Prior Publication Data

US 2018/0274673 A1 Sep. 27, 2018

(30) Foreign Application Priority Data

Mar. 22, 2017 (JP) ................................. 2017-056108

(51) Int. Cl.
*F16H 61/16* (2006.01)
*F01N 3/021* (2006.01)
(Continued)

(52) U.S. Cl.
CPC ............ *F16H 61/16* (2013.01); *B60W 10/06* (2013.01); *B60W 10/11* (2013.01); *B60W 30/18* (2013.01);
(Continued)

(58) Field of Classification Search
CPC ............ Y10T 477/60; Y10T 477/6934; B60W 30/18136; B60W 50/14; B60W 10/11;
(Continued)

(56) References Cited

U.S. PATENT DOCUMENTS 6,971,970 B2 * 12/2005 Inoue .................... B60W 10/06 477/97
2015/0330500 A1 * 11/2015 Sujan .................. F16H 61/0213 701/55

(Continued)

FOREIGN PATENT DOCUMENTS

JP 2003-294130 A 10/2003
JP 2008-19945 A 1/2008
(Continued)

*Primary Examiner* — Roger L Pang
(74) *Attorney, Agent, or Firm* — Sughrue Mion, PLLC

(57) ABSTRACT

A motor vehicle includes an engine having, in an exhaust system thereof, a particulate matter removal filter that removes particulate matters, a shift device capable of performing a sequential shift operation, and an electronic control unit that controls the engine such that the motor vehicle runs in accordance with a driver's operation. The electronic control unit is configured to perform control in such a manner as to cause the vehicle to run without carrying out a shift even when the sequential shift operation is performed by the driver, if a deposition amount of particulate matters deposited in the particulate matter removal filter is equal to or larger than a predetermined amount. Thus, the particulate matter removal filter can be restrained from being overheated through the supply of a large amount of air to the particulate matter removal filter with the predetermined amount or more of particulate matters deposited therein.

11 Claims, 3 Drawing Sheets

(51) Int. Cl.
*F16H 61/02* (2006.01)
*B60W 10/06* (2006.01)
*B60W 10/11* (2012.01)
*B60W 30/18* (2012.01)
*B60W 50/14* (2012.01)
*F16H 63/42* (2006.01)
*F01N 9/00* (2006.01)
*F01N 3/035* (2006.01)

(52) U.S. Cl.
CPC ...... *B60W 30/18136* (2013.01); *B60W 50/14* (2013.01); *F01N 3/021* (2013.01); *F01N 3/035* (2013.01); *F01N 9/002* (2013.01); *F16H 61/0213* (2013.01); *F16H 61/0248* (2013.01); *F16H 63/42* (2013.01); *B60W 2530/12* (2013.01); *B60W 2540/16* (2013.01); *B60W 2710/0644* (2013.01); *B60W 2710/1005* (2013.01); *F01N 2550/04* (2013.01); *F01N 2900/08* (2013.01); *F01N 2900/10* (2013.01); *F01N 2900/1606* (2013.01); *F16H 2061/0232* (2013.01); *Y02T 10/6221* (2013.01); *Y02T 10/6239* (2013.01); *Y02T 10/7077* (2013.01); *Y10T 477/60* (2015.01); *Y10T 477/6934* (2015.01)

(58) Field of Classification Search
CPC ......... B60W 10/06; B60W 2710/0644; B60W 2710/1005; B60W 2530/12; B60W 2540/16; F16H 61/16; F16H 61/0248; F16H 2061/0232; F01N 9/002; F01N 3/035; F01N 3/021; F01N 2900/1606; F01N 2550/04
See application file for complete search history.

(56) References Cited

U.S. PATENT DOCUMENTS

| | | | |
|---|---|---|---|
| 2017/0096136 A1 | 4/2017 | Nawata et al. | |
| 2017/0234198 A1* | 8/2017 | Dean | B60W 10/06 60/274 |
| 2018/0283301 A1* | 10/2018 | Higa | F02D 41/22 |
| 2019/0023261 A1* | 1/2019 | Kanayama | B60W 20/20 |

FOREIGN PATENT DOCUMENTS

| | | |
|---|---|---|
| JP | 2011-99451 A | 5/2011 |
| JP | 2015-174627 A | 10/2015 |
| JP | 2015-202832 A | 11/2015 |
| JP | 2015-229942 A | 12/2015 |
| WO | 2015/159218 A2 | 10/2015 |

* cited by examiner

MOTOR VEHICLE, CONTROL APPARATUS FOR MOTOR VEHICLE, AND CONTROL METHOD FOR MOTOR VEHICLE

INCORPORATION BY REFERENCE

The disclosure of Japanese Patent Application No. 2017-056108 filed on Mar. 22, 2017 including the specification, drawings and abstract is incorporated herein by reference in its entirety.

BACKGROUND

1. Technical Field

The disclosure relates to a motor vehicle, a control apparatus for the motor vehicle, and a control method for the motor vehicle. More particularly, the disclosure relates to a motor vehicle that is equipped with an engine having, in an exhaust system thereof, a particulate matter removal filter that removes particulate matters, a control apparatus for the motor vehicle, and a control method for the motor vehicle.

2. Description of Related Art

There is proposed a motor vehicle that is equipped, in an exhaust system thereof, with a filter for removing particulate matters and that causes swift regeneration of the filter by ensuring an operating time of an engine that is needed to raise the temperature of the filter (e.g., see Japanese Patent Application Publication No. 2015-202832 (JP 2015-202832 A)). This motor vehicle is equipped with an electric storage device that is charged when the engine is in operation. When regeneration of the filter is required, the control range of the remaining capacity of the electric storage device is made larger than in the case where regeneration of the filter is not required, and the remaining capacity is increased toward an upper limit of the control range after being reduced toward a lower limit of the control range.

SUMMARY

However, in the above-mentioned motor vehicle, the filter for removing particulate matters is overheated in some cases. When engine braking is activated by carrying a downshift with a certain amount of particulate matters deposited in the filter, a large amount of air is supplied to the filter, the particulate matters deposited in the filter burn, and the temperature of the filter becomes unnecessarily high.

A motor vehicle according to the disclosure restrains a particulate matter removal filter from being overheated.

The motor vehicle according to the disclosure has adopted the following means to achieve the above-mentioned main object.

A first aspect of the disclosure is a motor vehicle. The motor vehicle includes an engine that includes, in an exhaust system thereof, a particulate matter removal filter that removes particulate matters, a shift device capable of performing a sequential shift operation, and an electronic control unit that is configured to control the engine such that the motor vehicle runs in accordance with a driver's operation. The electronic control unit is configured to perform control in such a manner as to cause the motor vehicle to run without carrying out a shift even when the sequential shift operation is performed by the driver, if a deposition amount of particulate matters deposited in the particulate matter removal filter is equal to or larger than a predetermined amount.

With the aforementioned configuration, when the deposition amount of particulate matters deposited in the particulate matter removal filter that is attached to the exhaust system of the engine to remove particulate matters is equal to or larger than the predetermined amount, the control is performed such that the motor vehicle runs without carrying out a shift, even if the sequential shift operation is performed by the driver. Thus, engine braking based on a rise in the rotational speed of the engine through a shift (especially a downshift) can be suppressed, and a large amount of air can be restrained from being supplied to the particulate matter removal filter through engine braking at a high rotational speed. As a result, the particulate matter removal filter can be restrained from being overheated through the supply of a large amount of air to the particulate matter removal filter with the predetermined amount or more of particulate matters deposited therein. Besides, by forbidding an upshift as well, it becomes possible to avoid a situation where only an upshift is carried out and a downshift cannot be carried out, namely, a situation where an original state cannot be regained once an upshift is carried out.

In the motor vehicle, the electronic control unit may be configured to perform control in such a manner as to inform the driver that the sequential shift operation is not accepted, when the deposition amount is equal to or larger than the predetermined amount. With the aforementioned configuration, the driver can be informed that the sequential shift operation is not accepted, and the driver can be restrained from developing a feeling of strangeness. Incidentally, the driver may be informed that the sequential shift operation is not accepted, for example, through the display of this information on a display.

In the motor vehicle, the electronic control unit may be configured to restrain a rotational speed of the engine from rising when the deposition amount is equal to or larger than the predetermined amount. With the aforementioned configuration, engine braking can be restrained from being performed at a high rotational speed.

In the motor vehicle, the electronic control unit may be configured to perform control such that engine braking is not output, when the deposition amount is equal to or larger than the predetermined amount. With the aforementioned configuration, a large amount of air can be restrained from being supplied to the particulate matter removal filter. In this case, the electronic control unit may be configured to inform the driver that engine braking is not output, when the deposition amount is equal to or larger than the predetermined amount. In this manner, the driver can be informed that engine braking is not output, and the driver can be restrained from developing a feeling of strangeness. Incidentally, the driver may be informed that engine braking is not output, for example, through the display of this information on the display.

The motor vehicle may include a motor and an electric storage device. The motor may be configured to receive and output motive power for running. The electric storage device may be configured to exchange electric power with the motor. The engine may be configured to be driven using gasoline as fuel. That is, the motor vehicle may be a hybrid motor vehicle.

In the motor vehicle, the shift device may include a shift lever. The sequential shift operation may be an operation in which the shift lever is shifted from a sequential shift position to a predetermined position by the driver. The predetermined position may be either an upshift command position or a downshift command position.

The motor vehicle may include a deposition amount estimation apparatus. The electronic control unit may be configured to calculate the deposition amount using the deposition amount estimation apparatus.

A second aspect of the disclosure is a control apparatus for a motor vehicle. The motor vehicle includes an engine that includes, in an exhaust system thereof, a particulate matter removal filter that removes particulate matters, a shift device capable of performing a sequential shift operation, and an electronic control unit. The electronic control unit is configured to control the engine such that the motor vehicle runs in accordance with a driver's operation. The electronic control unit is configured to perform control in such a manner as to cause the vehicle to run without carrying out a shift even when the sequential shift operation is performed by the driver, if a deposition amount of particulate matters deposited in the particulate matter removal filter is equal to or larger than a predetermined amount.

A third aspect of the disclosure is a control method for a motor vehicle. The motor vehicle includes an engine that includes, in an exhaust system thereof, a particulate matter removal filter that removes particulate matters, a shift device capable of performing a sequential shift operation, and an electronic control unit that is configured to control the engine such that the motor vehicle runs in accordance with a driver's operation. The control method includes performing, by the electronic control unit, control in such a manner as to cause the motor vehicle to run without carrying out a shift even when the sequential shift operation is performed by the driver, if a deposition amount of particulate matters deposited in the particulate matter removal filter is equal to or larger than a predetermined amount.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Next, a mode for carrying out the disclosure will be described using the embodiment thereof.

Figure 1:
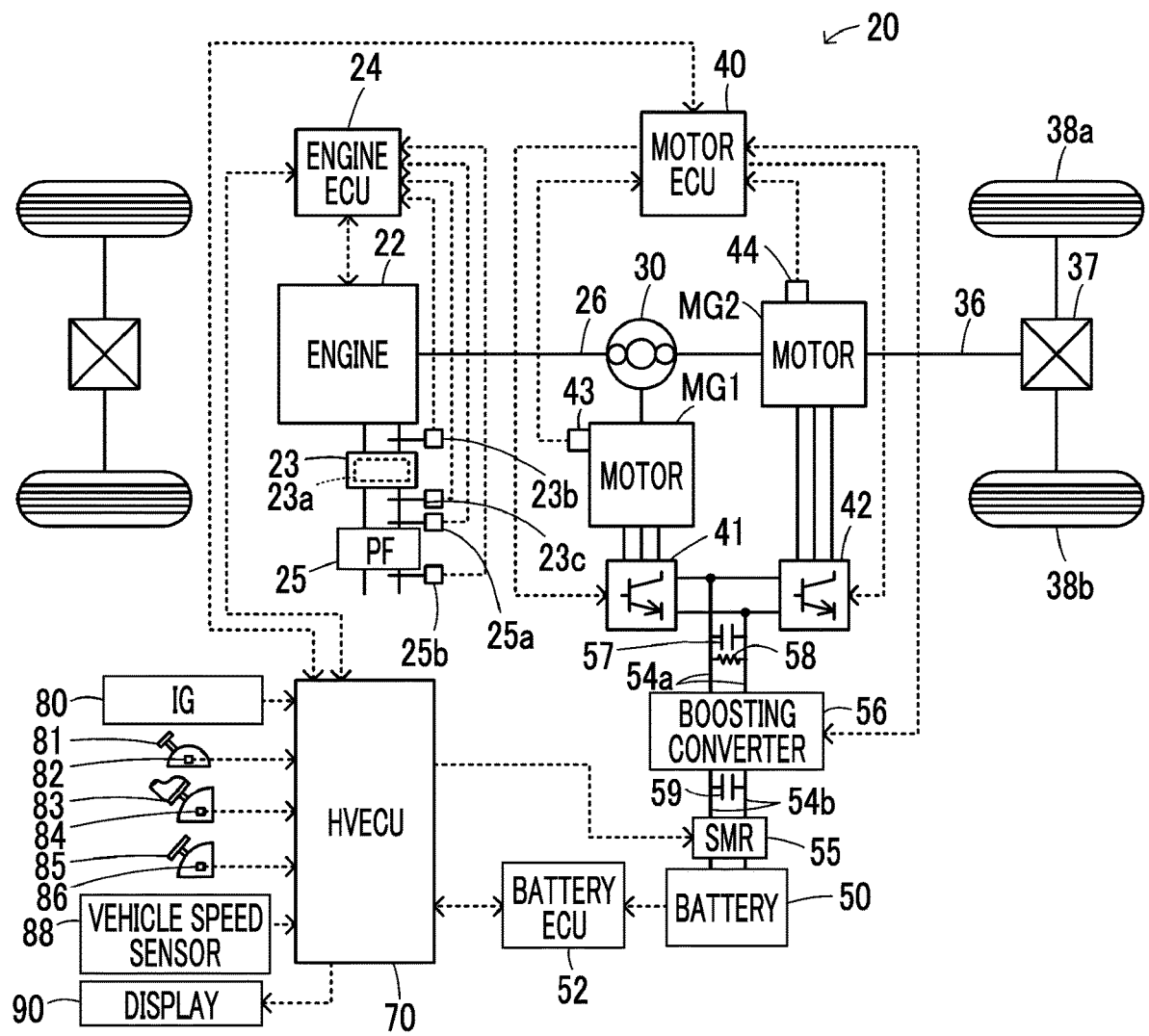
FIG. 1 is a block diagram showing the outline of the configuration of a hybrid motor vehicle 20 according to the first embodiment of the disclosure.

FIG. 1 is a block diagram showing the outline of the configuration of the hybrid motor vehicle 20 according to the first embodiment of the disclosure. As shown in the drawing, the hybrid motor vehicle 20 according to the embodiment of the disclosure is equipped with an engine 22, an engine electronic control unit (hereinafter referred to as an engine ECU) 24, a planetary gear 30, a motor MG1, a motor MG2, inverters 41 and 42, a motor electronic control unit (hereinafter referred to as a motor ECU) 40, a battery 50, a battery electronic control unit (hereinafter referred to as a battery ECU) 52, a boosting converter 56, and a hybrid electronic control unit (hereinafter referred to as an HVECU) 70.

The engine 22 is configured as an internal combustion engine that outputs motive power using gasoline, light oil or the like as fuel. Operation control of this engine 22 is performed by the engine electronic control unit (hereinafter referred to as the engine ECU) 24. An exhaust gas control apparatus 23 and a particulate matter removal filter (hereinafter referred to as a PM filter) 25 are attached to an exhaust system of the engine 22. The exhaust gas control apparatus 23 is filled with a catalyst 23a that removes unburnt fuel and nitrogen oxides in exhaust gas. The PM filter 25 is formed as a porous filter by ceramic, stainless or the like, and supplements particulate matters (PM) such as soot and the like. Incidentally, the PM filter 25 is referred to as a gasoline particulate filter (a GPF) when the engine 22 uses gasoline as fuel, and is referred to as a diesel particulate filter (a DPF) when the engine 22 uses light oil as fuel.

Although not shown in the drawing, the engine ECU 24 is configured as a microprocessor that is mainly constituted by a CPU, and is equipped with a ROM that stores a processing program, a RAM that temporarily stores data, input/output ports, and a communication port in addition to the CPU. Signals from various sensors that are needed to perform operation control of the engine 22 are input to the engine ECU 24 via the input ports respectively. As the signals from the various sensors, a crank position from a crank position sensor (not shown) that detects a rotational position of a crankshaft 26, a coolant temperature Tw from a coolant temperature sensor (not shown) that detects a temperature of coolant of the engine 22, and the like can be mentioned. Besides, a throttle opening degree TH from a throttle valve position sensor (not shown) that detects a position of a throttle valve, an intake air amount Qa from an airflow meter (not shown) that is attached to an intake pipe, an intake air temperature Ta from a temperature sensor (not shown) that is attached to an intake pipe, and the like can also be mentioned. Furthermore, an air-fuel ratio AF from an air-fuel ratio sensor 23b that is attached to an upstream side of the exhaust gas control apparatus 23 of the exhaust system, an oxygen signal O2 from an oxygen sensor 23c that is attached to a downstream side of the exhaust gas control apparatus 23, and pressures P1 and P2 from pressure sensors 25a and 25b that are attached to upstream and downstream sides of the PM filter 25 respectively can also be mentioned. Besides, various control signals for performing operation control of the engine 22 are output from the engine ECU 24 via the output ports respectively. As the various control signals, for example, a drive signal to fuel injection valves, a drive signal to a throttle motor that adjusts the position of the throttle valve, and a control signal to an ignition coil that is integrated with an igniter can be mentioned. The engine ECU 24 is connected to the HVECU 70 via the communication port. This engine ECU 24 performs operation control of the engine 22 in accordance with a control signal from the HVECU 70. Besides, the engine ECU 24 outputs, if necessary, data on an operating state of the engine 22 to the HVECU 70. The engine ECU 24 calculates a rotational speed of the crankshaft 26, namely, a rotational speed Ne of the engine 22 based on a crank angle θcr. Besides, the engine ECU 24 also calculates a volumetric efficiency (a ratio of a volume of air that is actually sucked in a single cycle to a cylinder capacity of the engine 22 per cycle) KL based on the intake air amount Qa from the airflow meter and the rotational speed Ne of the engine 22. The engine ECU 24 calculates a PM deposition amount Qpm as an estimated deposition amount of particulate matters captured by the PM filter 25 based on a differential pressure ΔP (ΔP=P1−P2) between the pressures P1 and P2 from the pressure sensors 25a and 25b, and calculates a filter temperature Tf as an estimated temperature of the PM filter 25 based on the operating state of the engine 22.

The planetary gear 30 is configured as a single pinion-type planetary gear mechanism. A rotor of the motor MG1, a drive shaft 36 that is coupled to driving wheels 38a and 38b via a differential gear 37, and the crankshaft 26 of the engine 22 are connected to a sun gear of the planetary gear 30, a ring gear of the planetary gear 30, and a carrier of the planetary gear 30 respectively.

The motor MG1 is configured as a well-known synchronous generator motor that is equipped with a rotor in which a permanent magnet is embedded, and a stator around which a three-phase coil is wound. As described above, the rotor is connected to the sun gear of the planetary gear 30. As is the case with the motor MG1, the motor MG2 is configured as a synchronous generator motor, and has a rotor that is connected to the drive shaft 36. The motors MG1 and MG2 are driven by controlling the inverters 41 and 42 by the motor ECU 40. The inverters 41 and 42 are connected to the boosting converter 56 that is connected to an electric power line (hereinafter referred to as a battery voltage-system electric power line) 54b to which the battery 50 and a system main relay 55 are connected by an electric power line (hereinafter referred to as a drive voltage-system electric power line) 54a. Although not shown in the drawing, each of the inverters 41 and 42 is configured as a well-known inverter that is constituted of six transistors and six diodes. Although not shown in the drawing, the boosting converter 56 is configured as a well-known boosting converter that is constituted of two transistors, two diodes, and a reactor L.

A smoothing capacitor 57 for smoothing and a discharge resistor 58 for discharge are connected in parallel to the drive voltage-system electric power line 54a. Besides, the system main relay 55 is attached to an output terminal side of the battery 50 of the battery voltage-system electric power line 54b. Furthermore, a filter capacitor 59 for smoothing is connected to the boosting converter 56 side of the battery voltage-system electric power line 54b.

Although not shown in the drawing, the motor ECU 40 is configured as a microprocessor that is mainly constituted of a CPU, and is equipped with a ROM that stores a processing program, a RAM that temporarily stores data, input/output ports, and a communication port in addition to the CPU. Signals that are needed to perform driving control of the motors MG1 and MG2, for example, rotational positions θm1 and θm2 from rotational position detection sensors 43 and 44 that detect rotational positions of the rotors of the motors MG1 and MG2, phase currents that are applied to the motors MG1 and MG2 respectively and that are detected by current sensors (not shown) respectively, and the like are input to the motor ECU 40 via the input ports respectively. Besides, a voltage of the smoothing capacitor 57 (a voltage of the drive voltage-system electric power line 54a that will be referred to hereinafter as a drive voltage-system voltage) VH from a voltage sensor (not shown) that is attached between terminals of the smoothing capacitor 57, a voltage of the filter capacitor 59 (a voltage of the battery voltage-system electric power line 54b that will be referred to hereinafter as a battery voltage-system voltage) VL from a voltage sensor (not shown) that is attached between terminals of the filter capacitor 59, and the like are also input to the motor ECU 40. Control signals for driving the inverters 41 and 42 and the boosting converter 56, and the like are output from the motor ECU 40 via the output ports respectively. Besides, the motor ECU 40 communicates with the HVECU 70, performs driving control of the motors MG1 and MG2 in accordance with a control signal from the HVECU 70, and outputs, if necessary, data on operating states of the motors MG1 and MG2 to the HVECU 70. Incidentally, the motor ECU 40 also calculates rotational speeds Nm1 and Nm2 of the motors MG1 and MG2 based on the rotational positions θm1 and θm2 of the rotors of the motors MG1 and MG2 from the rotational position detection sensors 43 and 44 respectively.

The battery 50 is configured as, for example, a lithium-ion secondary battery, and exchanges electric power with the motors MG1 and MG2 via the inverters 41 and 42 respectively. Although not shown in the drawing, the battery ECU 52 that manages the battery 50 is configured as a microprocessor that is mainly constituted of a CPU, and is equipped with a ROM that stores a processing program, a RAM that temporarily stores data, input/output ports, and a communication port in addition to the CPU. Signals that are needed to manage the battery 50, for example, a battery voltage Vb from a voltage sensor (not shown) that is installed between terminals of the battery 50, a battery current Ib from a current sensor (not shown) that is attached to the electric power line that is connected to the output terminal of the battery 50, a battery temperature Tb from a temperature sensor (not shown) that is attached to the battery 50, and the like are input to the battery ECU 52 via the input ports respectively. Besides, the battery ECU 52 communicates with the HVECU 70, and transmits, if necessary, data on the state of the battery 50 to the HVECU 70 through communication. In order to manage the battery 50, the battery ECU 52 calculates, based on an integrated value of a charge/discharge current Ib detected by the current sensor, an electric storage ratio SOC as a ratio of a capacity of an electric power that can be discharged from the battery 50 at that time to a total capacity, and calculates, based on the calculated electric storage ratio SOC and the battery temperature Tb, input/output limits Win and Wout, each of which is a maximum permissible electric power with which the battery 50 may be charged or which may be discharged from the battery 50.

Although not shown in the drawing, the HVECU 70 is configured as a microprocessor that is mainly constituted of a CPU, and is equipped with a ROM that stores a processing program, a RAM that temporarily stores data, input/output ports, and communication ports. Various signals that are needed to perform driving control and the like, for example, an ignition signal from an ignition switch 80, a vehicle speed V from a vehicle speed sensor 88, and the like are input to the HVECU 70 via the input ports respectively. Besides, a shift position SP from a shift position sensor 82 that detects an operation position of a shift lever 81, an accelerator depression amount Acc from an accelerator pedal position sensor 84 that detects a depression amount of an accelerator pedal 83, a brake pedal position BP from a brake pedal position sensor 86 that detects a depression amount of a brake pedal 85, and the like are also input to the HVECU 70. Control signals such as a drive signal to the system main relay 55, a display signal to a display 90 that is attached to an instrument panel in front of a driver seat, and the like are output from the HVECU 70 via the output ports respectively. As described previously, the HVECU 70 is connected to the engine ECU 24, the motor ECU 40, and the battery ECU 52 via the communication ports respectively, and exchanges various control signals and data with the engine ECU 24, the motor ECU 40, and the battery ECU 52.

In the hybrid motor vehicle 20 according to the embodiment of the disclosure, a sequential shift position (an S position) having an upshift command position and a downshift command position is prepared in addition to a parking position (a P position) that is used in parking the vehicle, a reverse position (an R position) for backward running, a neutral position (an N position), and a normal drive position (a D position) for forward running, as a shift position SP of the shift lever 81. It should be noted herein that the S position is a position for changing the driving force at the time when the accelerator is on and the braking force at the time when the accelerator is off during running (a braking force that is larger than at the D position) in, for example, six stages (braking/driving forces corresponding to shift speeds S1 to S6 respectively). Thus, at the S position, a shift feeling obtained by a virtual stepped transmission can be imparted to a driver.

The hybrid motor vehicle 20 according to the embodiment of the disclosure thus configured runs in a hybrid running (HV running) mode and an electric running (EV running) mode. It should be noted herein that the HV running mode is a mode in which the hybrid motor vehicle 20 runs with the engine 22 in operation, and that the EV running mode is a mode in which the hybrid motor vehicle 20 runs with the engine 22 out of operation.

When the hybrid motor vehicle 20 runs in the HV running mode, the HVECU 70 first sets a required torque Tr* that is required of running (that should be output to the drive shaft 36), based on the accelerator depression amount Acc from the accelerator pedal position sensor 84 and the vehicle speed V from the vehicle speed sensor 88. Subsequently, the HVECU 70 computes a required running power Pdrv* that is required of running, by multiplying the set required torque Tr* by the rotational speed Nr of the drive shaft 36. It should be noted herein that the rotational speed Nm2 of the motor MG2 or a rotational speed that is obtained by multiplying the vehicle speed V by a conversion coefficient can be used as the rotational speed Nr of the drive shaft 36. Then, the HVECU 70 sets a required power Pe* that is required of the vehicle, by adding a charge/discharge required power Pb* (which assumes a positive value when the battery 50 is charged) to the computed required running power Pdrv*. It should be noted herein that the charge/discharge required power Pb* is set, based on a difference ΔSOC between the electric storage ratio SOC of the battery 50 and a target ratio SOC*, such that the absolute value of the difference ΔSOC becomes small. Subsequently, the HVECU 70 sets a target operation point (a target rotational speed Ne* and a target torque Te*) of the engine 22 and torque commands Tm1* and Tm2* of the motors MG1 and MG2 such that the required power Pe* is output from the engine 22 and that the required torque Tr* is output to the drive shaft 36. The target operation point (the target rotational speed Ne* and the target torque Te*) of the engine 22 is set by determining in advance an optimal operation line for an operation point (a rotational speed and a torque) of the engine 22 where fuel economy is optimized, in consideration of noise, vibrations and the like, and obtaining the operation point (the rotational speed and the torque) on the optimal operation line that corresponds to the required power Pe*. The target operation point (the target rotational speed Ne* and the target torque Te*) of the engine 22 is transmitted to the engine ECU 24. The torque commands Tm1* and Tm2* for the motors MG1 and MG2 are transmitted to the motor ECU 40. The engine ECU 24 performs intake air amount control, fuel injection control, ignition control and the like of the engine 22, such that the engine 22 is operated based on the target operation point. The motor ECU 40 performs switching control of respective transistors of the boosting converter 56 and the inverters 41 and 42, such that the motors MG1 and MG2 are driven according to the torque commands Tm1* and Tm2* respectively.

When the hybrid motor vehicle 20 runs in the EV running mode, the HVECU 70 first sets the required torque Tr* based on the accelerator depression amount Acc from the accelerator pedal position sensor 84 and the vehicle speed V from the vehicle speed sensor 88, and computes the required running power Pdrv* by multiplying the required torque Tr* by the rotational speed Nr of the drive shaft 36. Subsequently, the HVECU 70 sets the torque command Tm1* for the motor MG1 to 0, and sets the torque command Tm2* for the motor MG2 such that the required torque Tr* (the required running power Pdrv*) is output to the drive shaft 36. The torque commands Tm1* and Tm2* for the motors MG1 and MG2 are transmitted to the motor ECU 40. As described above, the motor ECU 40 controls the boosting converter 56 and the inverters 41 and 42.

Figure 2:
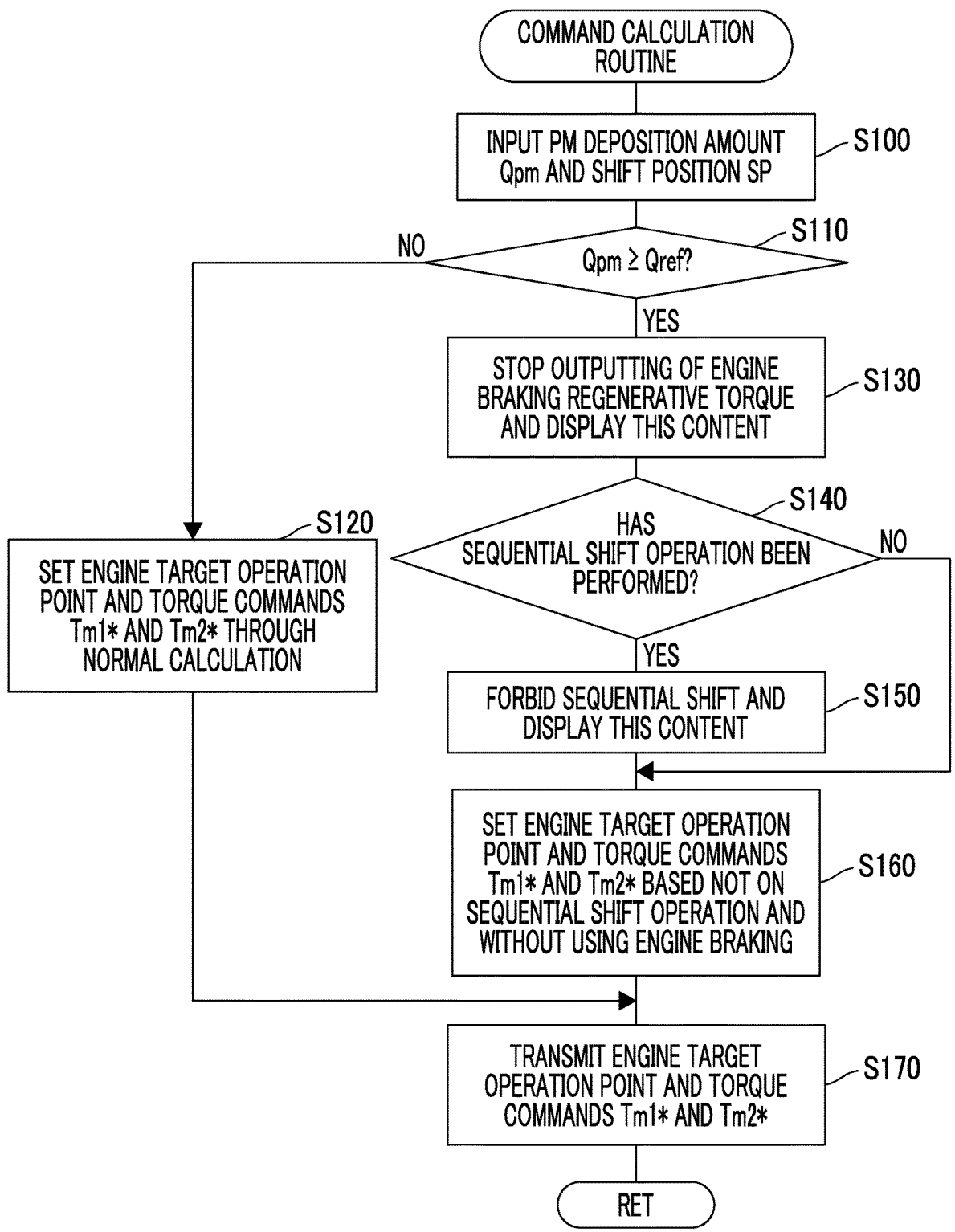
FIG. 2 is a flowchart showing an exemplary command calculation routine that is executed by an HVECU 70.

Next, the operation of the hybrid motor vehicle 20 according to the embodiment of the disclosure thus configured, especially the operation thereof at the time when the PM deposition amount Qpm of particulate matters deposited in the PM filter 25 is equal to or larger than a predetermined amount Qref will be described. The predetermined amount Qref can be determined in advance as a value at which it is determined that the PM filter 25 needs to be regenerated. FIG. 2 is a flowchart showing an exemplary command calculation routine that is executed by the HVECU 70. This routine is repeatedly executed at intervals of a predetermined time (e.g., at intervals of several milliseconds).

When the command calculation routine is executed, the HVECU 70 first executes a process of inputting the deposition amount Qpm of the PM filter 25 and the shift position SP from the shift position sensor 82 (step S100). The deposition amount Qpm of the PM filter 25 is calculated based on the differential pressure ΔP (ΔP=P1−P2) between the pressures P1 and P2 from the pressure sensors 25a and 25b, and is input through communication from the engine ECU 24.

Subsequently, the HVECU 70 determines whether or not the input deposition amount Qpm of the PM filter 25 is equal to or larger than the predetermined amount Qref (step S110). If it is determined that the deposition amount Qpm is smaller than the predetermined amount Qref, the HVECU 70 sets the target operation point (the target rotational speed Ne* and the target torque Te*) of the engine 22 and the torque commands Tm1* and Tm2* for the motors MG1 and MG2 through the above-mentioned normal computation (step S120). Then, the HVECU 70 transmits the set target operation point (the target rotational speed Ne* and the target torque Te*) of the engine 22 to the engine ECU 24, transmits the torque commands Tm1* and Tm2* for the motors MG1 and MG2 to the motor ECU 40 (step S170), and ends the present routine. The operation of the engine ECU 24 that has received the target operation point (the target rotational speed Ne* and the target torque Te*), and the operation of the motor ECU 40 that has received the torque commands Tm1* and Tm2* have been described above.

If it is determined in step S110 that the deposition amount Qpm is equal to or larger than the predetermined amount Qref, the HVECU 70 sets the stop of the outputting of a regenerative torque through engine braking, and displays this content (e.g., "engine braking cannot be used" etc.) on the display 90 that is incorporated in the instrument panel in front of the driver seat (step S130). Thus, a large amount of air can be restrained from being supplied to the PM filter 25 from the engine 22 through engine braking at the time when the deposition amount Qpm is equal to or larger than the predetermined amount Qref, and the driver can be informed that engine braking cannot be used.

Subsequently, the HVECU 70 determines, based on the shift position P, whether or not a sequential shift operation has been performed (step S140). It can be determined whether or not the sequential shift operation has been performed, by determining whether or not the shift lever 81 has been operated to the upshift command position or the downshift command position as the sequential shift position (the S position). If it is determined that the sequential shift operation has been performed, the HVECU 70 forbids a sequential shift, and displays this content (e.g., "sequential shift cannot be used" etc.) on the display 90 (step S150). Thus, a large amount of air can be restrained from being supplied to the PM filter 25 due to engine braking at a high rotational speed after the rotational speed Ne of the engine 22 is raised through the sequential shift operation (especially a downshift operation) when the deposition amount Qpm is equal to or larger than the predetermined amount Qref, and the driver can be informed that the sequential shift operation cannot be used.

Then, the HVECU 70 sets the target operation point (the target rotational speed Ne* and the target torque Te*) of the engine 22 and the torque commands Tm1* and Tm2* for the motors MG1 and MG2 based not on the sequential shift operation and without using engine braking (step S160), transmits these values (step S170), and ends the present routine, regardless of whether or not the sequential shift operation has been performed. In this case, the target operation point of the engine 22 and the torque commands Tm1* and Tm2* for the motors MG1 and MG2 can be set, for example, as follows. When the accelerator pedal 83 is on, the target operation point (the target rotational speed Ne* and the target torque Te*) of the engine 22 and the torque commands Tm1* and Tm2* for the motors MG1 and MG2 are set in the same manner as at the time of the running in the above-mentioned HV running mode. When the accelerator pedal 83 is off, the required torque Tr* as a deceleration required of running is set based on the brake pedal position BP from the brake pedal position sensor 86 and the vehicle speed V. Subsequently, the rotational speed Ne of the engine 22 at that time is made equal to the target rotational speed Ne* such that the engine 22 is autonomously operated at the rotational speed Ne at that time, the target torque Te* is set to 0, and the torque command Tm1* for the motor MG1 is set to 0. Then, the smaller one of the absolute value of the maximum value of a regenerative torque that can be output within the range of the input limit Win of the battery 50 and the absolute value of the required torque Tr* is selected, and the maximum value of the regenerative torque thus selected or the required torque Tr* thus selected is set as the torque command Tm2* for the motor MG2. Incidentally, when the torque command Tm2* for the motor MG2 is not sufficient for the required torque Tr*, a shortfall in the deceleration torque is applied by a hydraulic mechanical brake (not shown). By performing control in this manner, the target operation point of the engine 22 and the torque commands Tm1* and Tm2* for the motors MG1 and MG2 can be set in accordance with the driver's operation, without using the sequential shift operation and engine braking.

In the hybrid motor vehicle 20 according to the embodiment of the disclosure described above, when the PM deposition amount Qpm of particulate matters deposited in the PM filter 25 is equal to or larger than the predetermined amount Qref, the sequential shift is forbidden even if the driver performs the sequential shift operation. Thus, a large amount of air can be restrained from being supplied to the PM filter 25 due to engine braking at a high rotational speed after the rotational speed Ne of the engine 22 is raised through the sequential shift operation (especially the downshift operation). As a result, the PM filter 25 can be restrained from being overheated through the supply of a large amount of air to the PM filter 25. Besides, when the PM deposition amount Qpm is equal to or larger than the predetermined amount Qref, the stop of the outputting of a regenerative torque through engine braking is set. Thus, a large amount of air can be restrained from being supplied to the PM filter 25 through the performance of engine braking. As a result, the PM filter 25 can be restrained from being overheated through the supply of a large amount of air to the PM filter 25. Furthermore, when the sequential shift is forbidden or when the outputting of a regenerative torque through engine braking is stopped, this content is displayed on the display 90, so the driver can be informed thereof. Thus, the driver can be restrained from developing a feeling of strangeness due to the inability to use the sequential shift or engine braking.

In the hybrid motor vehicle 20 according to the embodiment of the disclosure, when the sequential shift is forbidden or when the outputting of a regenerative torque through engine braking is stopped, this content is displayed on the display 90 to inform the driver thereof. However, what matters is that the driver is informed of the content. Therefore, the driver may be informed of the content through audio output. Besides, from the standpoint of restraining the PM filter 25 from being overheated, it is also acceptable to refrain from informing the driver that the sequential shift has been forbidden or that the outputting of a regenerative torque through engine braking has been stopped.

In the hybrid motor vehicle 20 according to the embodiment of the disclosure, when the PM deposition amount Qpm of particulate matters deposited in the PM filter 25 is equal to or larger than the predetermined amount Qref, the sequential shift is forbidden, and the outputting of a regenerative torque through engine braking is stopped. However, when the PM deposition amount Qpm of particulate matters deposited in the PM filter 25 is equal to or larger than the predetermined amount Qref, it is also acceptable to simply forbid the sequential shift and refrain from stopping the outputting of a regenerative torque.

Figure 3:
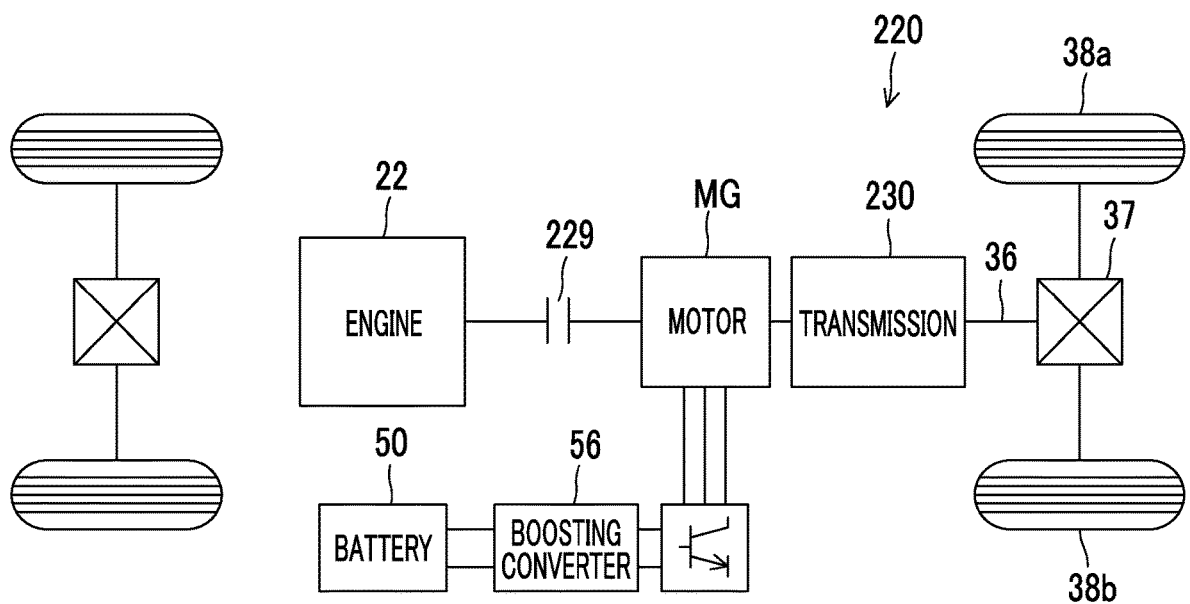
FIG. 3 is a block diagram showing the outline of the configuration of a hybrid motor vehicle 220 according to a modification example.
Figure 4:
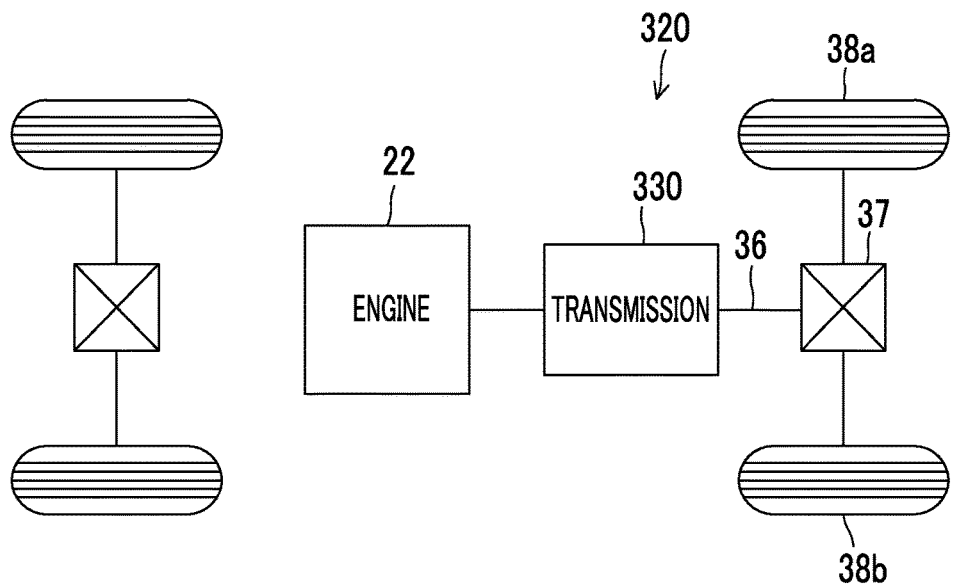
FIG. 4 is a block diagram showing the outline of the configuration of a motor vehicle 320 according to another modification example.

The hybrid motor vehicle 20 according to the embodiment of the disclosure is configured such that the engine 22 and the two motors MG1 and MG2 are connected to the planetary gear 30. The motor vehicle is only required to be equipped with the PM filter 25 in the exhaust system of the engine 22, and enable the sequential shift operation. Therefore, it is also appropriate to adopt a configuration in which a motor MG is connected to the drive shaft 36 coupled to the driving wheels 38a and 38b via a transmission 230 and the engine 22 is connected to the motor MG via a clutch 229 as is the case with the hybrid motor vehicle 220 exemplified in FIG. 3, or a configuration in which the engine 22 is connected to the drive shaft 36 coupled to the driving wheels 38a and 38b via a transmission 330 as is the case with the motor vehicle 320 exemplified in FIG. 4.

A corresponding relationship between the main elements of the embodiment of the disclosure and the main elements of the disclosure mentioned in the section of means for solving the problem will be described. In the embodiment of the disclosure, the PM filter 25 is an example of "the particulate matter removal filter", the engine 22 is an example of "the engine", and the HVECU 70, the engine ECU 24, the motor ECU 40, and the battery ECU 52 are an example of "the electronic control unit".

Incidentally, the corresponding relationship between the main elements of the embodiment of the disclosure and the main elements of the disclosure mentioned in SUMMARY does not limit the elements of the disclosure mentioned in SUMMARY, because the embodiment of the disclosure is an example for concretely explaining the mode for carrying out the disclosure mentioned in SUMMARY. That is, the disclosure mentioned in SUMMARY should be interpreted based on the description in this section, and the embodiment of the disclosure is nothing more than a concrete example of the disclosure mentioned in SUMMARY.

Although the mode for carrying out the disclosure has been described above using the embodiment thereof, it is obvious that the disclosure is not limited to this embodiment thereof at all, but can be carried out in various modes within such a range as not to depart from the gist thereof.

The disclosure can be utilized in automobile manufacturing industries and the like.

What is claimed is:

1. A motor vehicle comprising:
    an engine including, in an exhaust system thereof, a particulate matter removal filter that removes particulate matters;
    a shift device capable of performing a sequential shift operation; and
    an electronic control unit configured to control the engine such that the motor vehicle runs in accordance with a driver's operation,
    the electronic control unit configured to perform control in such a manner as to cause the motor vehicle to run without carrying out a shift even when the sequential shift operation is performed by the driver, if a deposition amount of particulate matters deposited in the particulate matter removal filter is equal to or larger than a predetermined amount.

2. The motor vehicle according to claim 1, wherein the electronic control unit is configured to perform control in such a manner as to inform the driver that the sequential shift operation is not accepted, when the deposition amount is equal to or larger than the predetermined amount.

3. The motor vehicle according to claim 1, wherein the electronic control unit is configured to restrain a rotational speed of the engine from rising when the deposition amount is equal to or larger than the predetermined amount.

4. The motor vehicle according to claim 1, wherein the electronic control unit is configured to perform control such that engine braking is not output, when the deposition amount is equal to or larger than the predetermined amount.

5. The motor vehicle according to claim 4, wherein the electronic control unit is configured to inform the driver that engine braking is not output, when the deposition amount is equal to or larger than the predetermined amount.

6. The motor vehicle according to claim 2, wherein the electronic control unit is configured to provide information by displaying the information on a display.

7. The motor vehicle according to claim 1, further comprising:
    a motor configured to receive and output motive power for running; and
    an electric storage device configured to exchange electric power with the motor,
    wherein
    the engine is configured to be driven using gasoline as fuel.

8. The motor vehicle according to claim 1, wherein
    the shift device includes a shift lever,
    the sequential shift operation is an operation in which the shift lever is shifted from a sequential shift position to a predetermined position by the driver, and
    the predetermined position is one of an upshift command position and a downshift command position.

9. The motor vehicle according to claim 1, further comprising
    a deposition amount estimation apparatus,
    wherein
    the electronic control unit is configured to calculate the deposition amount using the deposition amount estimation apparatus.

10. A control apparatus for a motor vehicle,
    the motor vehicle including an engine, and a shift device capable of performing a sequential shift operation,
        the engine including, in an exhaust system thereof, a particulate matter removal filter that removes particulate matters,
    the control apparatus comprising:
        an electronic control unit configured to control the engine such that the motor vehicle runs in accordance with a driver's operation; and
        the electronic control unit configured to perform control in such a manner as to cause the vehicle to run without carrying out a shift even when the sequential shift operation is performed by the driver, if a deposition amount of particulate matters deposited in the particulate matter removal filter is equal to or larger than a predetermined amount.

11. A control method of a motor vehicle,
    the motor vehicle including an engine, a shift device capable of performing a sequential shift operation, and an electronic control unit configured to control the engine such that the motor vehicle runs in accordance with a driver's operation,
        the engine including, in an exhaust system thereof, a particulate matter removal filter that removes particulate matters,
    the control method comprising:
    performing, by the electronic control unit, control in such a manner as to cause the vehicle to run without carrying out a shift even when the sequential shift operation is performed by the driver, if a deposition amount of particulate matters deposited in the particulate matter removal filter is equal to or larger than a predetermined amount.

* * * * *